Dec. 6, 1966 C. W. HEWLETT, JR 3,289,677
ELECTRICAL READOUT INTEGRATOR HAVING POROUS
INSULATORS AND SPACED ELECTRODES
IN AN ELECTROLYTE
Filed March 29, 1963
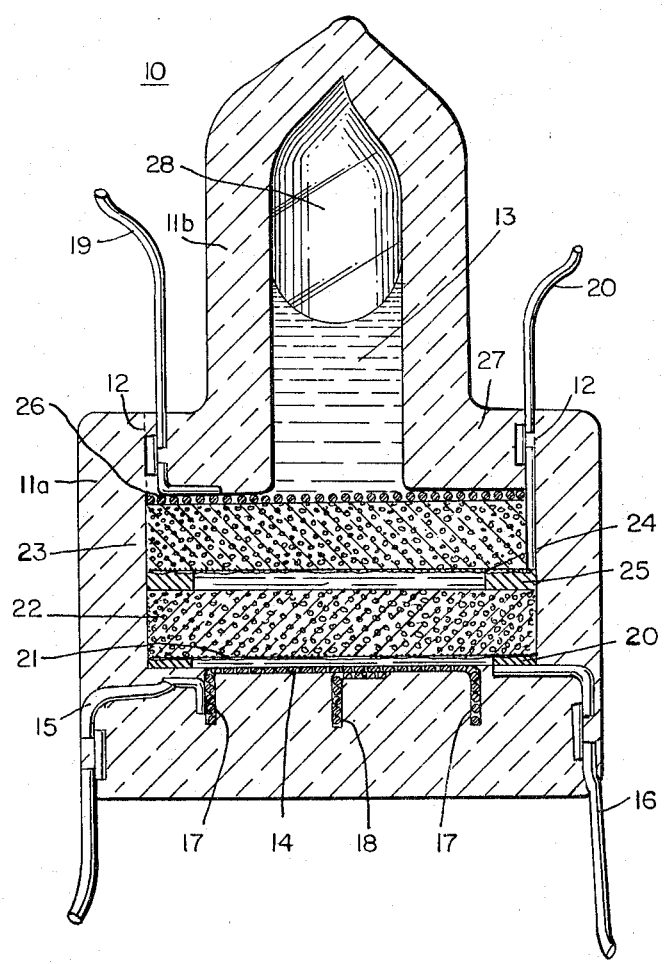
INVENTOR.
CLARENCE W. HEWLETT JR.
BY
HIS ATTORNEY United States Patent Office
3,289,677
Patented Dec. 6, 1966

3,289,677
ELECTRICAL READOUT INTEGRATOR HAVING POROUS INSULATORS AND SPACED ELECTRODES IN AN ELECTROLYTE
Clarence W. Hewlett, Jr., Hampton, N.H., assignor to General Electric Company, a corporation of New York
Filed Mar. 29, 1963, Ser. No. 269,037
14 Claims. (Cl. 317—231)

This invention relates to electrochemical devices, and more particularly, to an improved solion.

A solion is a precision electrochemical cell utilizing an electrolytic solution which enters into a reversible electrochemical reaction at its electrodes under preselected operating conditions. One of the characteristics of such devices which makes them extremely useful is their ability to reliably integrate applied electrical signals.

Such devices are characterized by the separation of the container by its electrodes into two compartments separated by a barrier space. The first compartment is termed the reservoir and is defined by an input electrode and a shield electrode, while the second, or integral compartment, is defined by the readout electrode and a common electrode. The space thus formed between the readout and shield electrode is referred to as the barrier space.

As is well known, the chemical reaction which takes place in one form of solion device may be the result of the reduction of one species of the ions in solution at one of the electrodes and the corresponding oxidation of the other species of the ion at another electrode of the system. This redox system must be completely reversible in a solion in order for it to accurately perform its integrating function. This will obtain as long as the applied voltages stay below the potential at which the ions of the solution react with the electrodes to generate a gaseous by-product that will escape from the solution. Thus, the electrodes and the electrolyte of a solion are so chosen that at their operating potentials they do not enter into an electrochemical reaction which is irreversible. Thus, the electrochemical reaction results in the interchange of electrons between the ions in solution and the electrodes to thus change the signal from the form in which it is represented by electron conduction in a metallic conductor to the form in which it is represented by ionic conduction in the electrolytic solution.

A common electrolyte for the solion redox system is an aqueous solution containing a small amount of iodine and a comparatively large amount of potassium iodide. This results in a solution containing iodide ions and triiodide ions, the latter of which will hereinafter be referred to as iodine. In such a redox system, iodine becomes what has been termed the measured species, while the iodide ion is the unmeasured species of the ion of the solution. If the signal to be integrated is applied between the common and input electrodes, while the common electrode is positive with respect to the input electrode, the concentration of iodine will increase at the common electrode. If a potential is now placed across the integral compartment by making the common electrode positive with respect to the readout electrode, a current will flow which is proportional to the amount of iodine within the integral compartment. Thus, the readout current will be proportional to the charge transferred between the input and common electrodes thus giving the desired integration function.

A solion is a precision electrochemical device which necessitates extreme care in its manufacture in order to obtain a reliable device with desirable operational characteristics. Operational reliability is a significant factor to be considered in the construction and design of a solion due to the precise spacing necessary between various elements of the device which renders it susceptible to both open circuits and shorts. Such operational problems have necessitated the exercise of great care in the design and assembly of the solion devices thus rendering them expensive and difficult to produce on a production line basis without encountering a high rate of rejects. The production of prior art solions has thus been, of necessity, essentially a hand assembly operation for a highly skilled operator.

It is therefore an object of the invention to simplify the construction of solions by minimizing the number of necessary components, as well as minimizing the number and criticality of the steps necessary in its assembly.

A great deal of effort has also been expended in designing and constructing solions so as to improve their operational characteristics. Two of the more important areas of effort relate to the improvement of response time or frequency response, as well as the minimization of drift rate. The response time has to do with the length of time after a charge has been introduced before the readout current will respond to this charge. This time should, of course, be minimized in order to increase the frequency response of the unit.

The drift rate, on the other hand, effectively controls the length of time that an integral can be stored in the compartment with any given degree of accuracy. The drift of a unit is evidenced by a long term change of the readout current when a given integral is being stored in the device. This phenomenon is due to the diffusion of the iodine or measured species across the barrier space.

It is therefore another object of the invention to provide a simplified solion which is easier to construct, while at the same time displaying improved drift characteristics.

It is a further object of this invention to provide a solion wherein the accurate control of critical spacing of elements is readily facilitated and dimensional stability is thereafter maintained due to its manner of construction.

It is yet another object of this invention to provide a solion in which the electrical connections to the electrodes are easily obtained during the assembly of the device without requiring time consuming and critical operations.

It is still another object of this invention to provide a solion in which the integral compartment is defined by electrodes which have substantially planar surfaces which facilitate the extremely close parallel alignment of the electrodes to provide a fast response time and correspondingly high frequency response.

Briefly described, this invention contemplates stacking two glass frit disks, each of which bear platinum electrodes; two annular conductive rings; and a third platinum electrode within a glass cup-shaped container, the bottom of which contains a fourth electrode molded in its bottom. Upon stacking the previously-noted elements in their proper order within the cup-shaped container, a glass top is inserted within the open top of the cup-shaped container and brought into position in contact with the top of the stack. The top is then sealed in this position and the open tube, integral with the top which provides access to the interior of the container, may then be utilized to evacuate the container when it is under heat so that the softened container is brought into intimate contact with the stacked elements. Thereafter, the tube may be used for filling the container with the solution after which it is sealed off to complete the unit and also provide an expansion chamber in the end of the tube.

The subject matter of the invention is particularly pointed out and distinctly claimed in the concluding portion of this specification. The invention, however, both as to organization and method of operation, together with further objects and advantages thereof, may best be understood by reference to the following description taken in connection with the accompanying drawing which is a cross-sectional and elevational view of the preferred embodiment of this invention.

Referring now to the drawing, there is shown a solion device 10 which may be employed as an integrator. This solion integrator 10 includes a container consisting of glass cup-shaped portion 11a and top portion 11b which, when sealed together along surface 12, provides a sealed container for the electrolytic solution 13.

One preferred glass suitable for the solion container 11 and the glass frits is a chemically inert, heat resistant, low expansion glass denoted as Pyrex glass. One or the preferred types of Pyrex is commercially available as 7740 Pyrex glass. The use of Pyrex glass, plus the selection of platinum or its noble metal alloys for the electrodes, provides a device the elements of which are chemically inert to the electrolyte and its solvent. One of the common redox systems now in use contains iodine ($I_2$) and potassium iodide (KI) in an aqueous solution with the concentration of KI usually about 100 times the concentration of $I_2$. This discussion will proceed with reference to the operation of the device of the invention with reference to a potassium iodide-iodine redox system, even though it should be recognized that the invention is equally applicable to other redox systems.

Lead 15, which is welded to portion 17 of common electrode 14, and read out electrode lead 16 are imbedded in cup-shaped portion 11a during its molding to provide means for establishing an externally available connection to the corresponding electrode. Common electrode 14, which is formed of platinum gauze of about 80 mesh, is also molded in cup-shaped portion 11a during the molding operation which can be carried out by a plunger and die assembly which simultaneously molds portion 11a while pressing the electrode and leads in place.

In the preferred embodiment, for simplicity and accuracy, the die is formed so that the top surface of common electrode 14 is flush with the annular surrounding area with which spacer 20 is later brought in contact. Thus, the spacing between the electrodes of the integral compartment is governed by the thickness of spacer 20. In addition, spacer 20 also provides a convenient manner for automatically establishing a connection between lead 16 and readout electrode 21 during the assembly operation. This type of construction readily lends itself to changing the size of the integral compartment so as to obtain desired operational characteristics merely by changing the thickness of the spacer used during the assembly operation.

Portion 17 is provided to stiffen common electrode 14 in cooperation with L-shaped stiffening element 18 during the molding operation. In addition, portion 17 and element 18 facilitate the anchoring of control electrode 14 to container portion 11a upon completion of the molding operation.

It is an important feature of the invention that the gauze from which common electrode 14 is formed has been flattened prior to the molding operation so that it presents a substantially planar surface with small apertures therein for reasons which will hereinafter be more completely discussed.

Readout electrode 21 is, in turn, in the form of a sputtered layer of platinum placed upon the lower surface of disk-like glass frit insulator 22. Shield electrode 24 is in like manner sputtered on the lower surface of disk-like glass frit 23. Platinum spacer 25, which is interposed between shield electrode 24 and glass frit 22 is 5 mils thick in the preferred embodiment and provides means for completing a connection between shield electrode 24 and shield lead 20.

Input electrode 26, which may also be composed of platinum gauze of about 80 mesh, is in turn held in contact with the upper surface of disk 23 due to the pressure exerted by collar 27 when top 11b is brought into position in contact with the stacked array of elements.

Notches are provided at two points around the periphery of collar 27 in order to accommodate leads 19 and 20 which are welded to input electrode 26 and shield-contacting annular ring 25, respectively. These notches are filled during the flame sealing operation to secure a vacuum-tight joint along this line.

Provisions have been made to prevent the leakage of solution around leads 15, 16, 19 and 20 which are connected to their corresponding electrodes by passing through the wall of container 11. An effective seal between these leads and the glass container is provided by the platinum-tungsten-platinum butt-welded joints since tungsten will bond to the Pyrex glass, while platinum will not, thereby affording the necessary seal. However, it should be recognized that externally available tungsten leads may be utilized thus necessitating only platinum-tungsten butt-welded joints within the walls on container 11b.

Referring now to the integral compartment formed between readout electrode 21 and common electrode 14, the response time of the solion, as well as its sensitivity, will be primarily determined by the distance between these two electrodes. The smaller the interelectrode spacing that may be accurately maintained without shorting, the faster the response time and the higher will be the sensitivity attainable.

Heretofore, it has been the practice to use platinum gauze in its conventional form for the common electrode since the apertures provided therein aid in quickly achieving equilibrium of the measured species in the integral compartment by providing fast access by the solution between the common electrode and the supporting glass to the integrator compartment. It has been found that further improvement in response time and sensitivity of the prior art solions has been limited by the inability to place the electrodes any closer together without increasing the incidence of shorts between the electrodes.

In accordance with the invention, significant improvement in response time and sensitivity is readily obtained without increasing the incidence of electrode shorting by applying large forces to flatten the gauze utilized so that it will provide a substantially planar electrode surface. This accomplishes the desired results since the average of all the interelectrode path lengths is decreased until it is of the same order of magnitude as the shortest path length. This may be seen when you consider that the shortest electrode path length in the average solion is of the order of a few mils; e.g., in the preferred embodiment, platinum spacer 20 is 2 mils thick, while the diameter of the wire forming the gauze is of the same order of magnitude when 80 mesh gauze is utilized. Furthermore, since the gauze is normally formed by weaving the wire, the difference between the shortest path length and the longest is correspondingly increased. These factors are important since the sensitivity and response time attainable with such devices is, in the final analysis, a function of the longest path length between the integral compartment electrodes.

The interrelationship between interelectrode path length, response and sensitivity may be explained by the fact that when an input signal is applied across the input and common leads iodine is deposited along the surface of the common electrode when the common electrode is positive with respect to the input electrode. This newly deposited iodine must then diffuse across the integral compartment and appear at the readout electrode before its presence can be evidenced by current flowing in the readout circuit. Since the time constant of diffusion of the iodine between the common and readout electrodes varies as the square of the distance between the electrodes, it can be seen that the presence of significantly longer path lengths between certain portions of the common electrode and the readout electrode will greatly increase the response time of the unit.

To summarize, a precision electrochemical solion device is provided by molding the common electrode of flattened gauze mesh into a predetermined position wherein it will cooperate with, and be properly spaced from, a sputtered platinum readout electrode by stacking the glass frit disk bearing the readout electrode upon a platinum spacer. Thus, the extremely critical integral compartment is automatically formed without requiring any highly critical or time consuming steps or operations. The solion device is thereafter completed by stacking the additional elements, as well as the top portion of the container, within the open end of the cup. The assembly operation is then completed by applying pressure to the stacked assembly and flame sealing the top to the body of the device.

Glass frits having pores in the range of .8 to 1.4 microns have been found to be successful in minimizing stirring when the unit is moved or vibrated. Platinum is sputtered on the glass frits to a thickness that will provide about a 10 ohm resistance across the diameters of the shield electrode and the readout electrode. It is obvious that the sputtering provides an electrode which is securely attached to the glass frit base and has small pores therein to further prevent the leakage of the measured species between the two compartments through the barrier space.

The following dimensions have been found to provide a suitable solion device with the previously noted advantages in construction and improved operational characteristics. The outer diameter of cup-shaped portion 11a is of the order of 13 millimeters, while its inner diameter is about 10 millimeters. The outer diameter of the tube 11b is approximately 6.6 millimeters, while its inner diameter is 3.3 millimeters. The glass frits are of the thickness of 1.7 millimeters and having an outer diameter which matches the inner diameter of cup-shaped portion 11a.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. An electrical readout integrator comprising a redox electrolytic solution, a container for said electrolytic solution; a plurality of spaced electrodes arranged within said container, said plurality comprising an input electrode, a shield electrode, a readout electrode and a common electrode; first porous insulating means interposed between and in contact with said input and said shield electrodes, said input and shield electrodes defining a reservoir compartment therebetween, said shield electrode being deposited on one planar surface of said first porous insulating mean; second porous insulating means interposed between said shield and said readout electrodes, said readout electrode being deposited on one planar surface of said second porous insulating means; first electrically conductive means interposed between and in contact with said shield electrode and said second insulating means for establishing a connection to said shield electrode; second electrically conductive means for spacing apart said readout and common electrodes to define an integral compartment therebetween; and a plurality of conductor means connected to said input electrode, said first electrically conductive means, said second electrically conductive means and said common electrode for establishing externally available connections to said electrodes, said electrodes being taken from the class consisting of platinum and its noble metal alloys.

2. An electrical readout integrator comprising a redox electrolytic solution, a container for said electrolytic solution; a plurality of spaced electrodes coaxially arranged within said container, said plurality comprising an input electrode, a shield electrode, a readout electrode and a common electrode; first porous insulating means interposed between and in contact with said input and shield electrodes and in contact with said container, said input and shield electrodes defining a reservoir compartment therebetween, said shield electrode being deposited on one planar surface of said first porous insulating means; second porous insulating means interposed between said shield and readout electrodes and in contact with said container, said readout electrode being deposited on one planar surface of said second porous insulating means; said first and second porous insulating means being disk-shaped and arranged within said container coaxially with respect to the axis of said electrodes; first electrically conductive means interposed between and in contact with said shield electrode and said second insulating means and in contact with said container for establishing a connection to said shield electrode; second electrically conductive means for spacing apart said readout and common electrodes to define an integral compartment therebetween; and a plurality of conductor means connected to said input electrode, said first electrically conductive means, said second electrically conductive means and said common electrode for establishing externally available connections to said electrodes, said electrodes being taken from the class consisting of platinum and its noble metal alloys.

3. An electrical readout integrator comprising a redox electrolytic solution, a container for said electrolytic solution; a plurality of spaced electrodes coaxially arranged within said container, said plurality comprising an input electrode, a shield electrode, a readout electrode and a common electrode; first and second spaced disklike porous insulators arranged within said container coaxially with respect to the axis of said electrodes; said first porous insulator being interposed between and in contact with said input and shield electrodes and in contact with said container to define a reservoir compartment therebetween, said shield electrode being deposited on one planar surface of said first insulator; said second porous insulator being interposed between said shield and said readout electrodes, in contact with said container and said readout electrode being deposited on one planar surface of said second insulator; first electrically conductive means interposed between and in contact with said shield electrode and said second insulator for establishing a connection to said shield electrode; a conductor passing through the wall of said container and terminating at an inner surface of said container, second electrically conductive means interposed between said readout electrode and said container for spacing said readout electrode from an end of said container, said common electrode being supported in a fixed position with respect to said end to define an integral compartment in cooperation with said readout electrode, said second electrically conductive means being in contact with said conductor for establishing a connection between said conductor and said readout electrode; means connected to said first conductive means for establishing an externally available connection to said shield electrode and first and second conductor means connected to said input and common electrodes for establishing externally available connections thereto, said electrodes being taken from the class consisting of platinum and its noble metal alloys.

4. An electrical readout integrator comprising a redox electrolytic solution, a container for said electrolytic solution; a plurality of spaced electrodes coaxially arranged within said container, said plurality comprising an input electrode, a shield electrode, a readout electrode and a common electrode; first and second disklike porous insulators arranged within said container coaxially with respect to the axis of said electrodes; said first porous insulator being interposed between and in contact with said input and shield electrodes and in contact with said container to define a reservoir compartment therebetween; said second porous insulator being interposed between said shield and said readout electrodes and in contact with said container; said readout electrode being in contact with said second insulator; said electrodes and said insulators being shaped to have a cross-section substantially identical to the cross-section of the interior of said container to prevent the passage of said solution between compartments by passing around said electrodes and said insulators; an annular conductive disk the periphery of which is substantially identical to said interior cross-section; said annular disk being interposed between and in contact with said shield electrode and said second insulator for establishing a connection to said shield electrode; means for spacing apart said readout and common electrodes to define an integral compartment therebetween; and a conductor passing through the wall of said vessel and terminating on said annular conductive disk for establishing a connection to said shield electrode and a plurality of conductor means connected to said input, readout and common electrodes for establishing externally available connections thereto, said electrodes being taken from the class consisting of platinum and its noble metal alloys.

5. An electrical readout integrator comprising a redox electrolytic solution, a container for said electrolytic solution; a plurality of spaced electrodes coaxially arranged within said container, said plurality comprising an input electrode, a shield electrode, a readout electrode and a common electrode; first and second spaced disk-like porous insulators arranged within said container coaxially with respect to the axis of said electrodes; said first porous insulator being interposed between and in contact with said input and shield electrodes and in contact with said container to define a reservoir compartment therebetween; said second porous insulator being interposed between said shield and said readout electrodes and in contact with said container; said readout electrode being in contact with said second insulator; said electrodes and said insulators being shaped to have a cross-section substantially identical to the cross-section of the interior of said container to prevent the passage of said solution between compartments by passing around said electrodes and said insulators; an annular conductive disk the periphery of which is substantially identical to said interior cross-section; said annular disk being interposed between and in contact with said shield electrode and said second insulator for establishing a connection to said shield electrodes; a first conductor passing through the wall of said container and terminating at an inner surface of said container, a second annular conductive disk the periphery of which is substantially identical to said interior cross-section; said second annular disk being interposed between said readout electrode and said container for spacing apart said readout electrode and an end of said container, said common electrode being supported in a fixed position with respect to said end to define an integral compartment in cooperation with said readout electrode; said second annular disk being in contact with said conductor for establishing a connection between said conductor and said readout electrode; a second conductor passing through said container and being electrically connected to said first annular disk for establishing a connection to said shield electrode and third and fourth conductors passing through said container and being electrically connected to said input and common electrodes for establishing externally available connections thereto, said electrodes being taken from the class consisting of platinum and its noble metal alloys.

6. The combination of claim 5 in which said common electrode is secured to and in intimate contact with said end of said container, said common electrode having minute apertures therein whereby all of the ions in solution in said integral compartment are free to engage in ionic conduction.

7. The combination of claim 6 in which said common electrode comprises a cup-shaped element of gauze, the gauze having been flattened by the application of a large force so as to present a substantially planar surface with small apertures therein, said cup-shaped element being molded in said end of said container so that only the bottom of said cup-shaped element is exposed to operate as the active portion of said common electrodes.

8. The combination of claim 7 in which the outer periphery of the active portion of said common electrode terminates short of the line of contact of the inner periphery of said second annular disk with said end.

9. The combination of claim 8 in which said container is Pyrex glass and said porous insulators are glass frits.

10. The combination of claim 9 in which said shield and readout electrodes are respectively sputtered on a planar surface of said first and second glass frit disks.

11. The combination of claim 10 in which said input electrode is gauze, said gauze being retained in contact with said first glass frit disk by being interposed between and in contact with said first glass frit disk and an inner surface of the container opposed to said end, said opposed inner surface terminating in an expansion chamber which is in direct communication with a central portion of said input electrode.

12. The combination of claim 11 in which said electrolyte comprises an aqueous solution of potassium iodide and iodine.

13. An electrical readout integrator comprising a container having a portion with a generally cylindrical interior containing an electrolytic solution; first and fourth electrodes in physical contact with the opposed ends of said sylindrical portion, a first porous glass frit disk having a second electrode in contact with one of its surfaces, the surface of said first disk which is opposed to said one surface being in contact with said first electrode, a second porous glass frit disk having a third electrode in contact with one of its surfaces, the surface of said second disk which is opposed to said one surface being in spaced parallel alignment with said second electrode, said space between said second disk and said second electrode being solely filled with said solution except for the peripheral region of said space; means for spacing said third electrode in parallel alignment with said fourth electrode; and means for establishing externally available electrical connections for each of said electrodes, said electrodes being taken from the class consisting of platinum and its noble metal alloys.

14. An electrical readout integrator comprising a redox electrolytic solution, a container for said electrolytic solution, a plurality of spaced electrodes arranged within said container, said plurality comprising an input electrode; a shield electrode; a readout electrode and a common electrode; means for supporting said input and shield electrodes in generally parallel alignment within said container to define a reservoir compartment, a disk-like porous insulator supported within said container interposed between said input and shield electrodes to limit diffusion from said reservoir compartment; means for supporting said readout electrode in generally parallel alignment with said shield electrode to define a barrier compartment; and means for supporting said common electrode in spaced parallel alignment with said readout electrode to define an integral compartment, said common electrode supporting means comprising means for establishing an electrical connection to said readout electrode and means for establishing externally available connections for each of said electrodes, said electrodes being taken from the class consisting of platinum and its noble metal alloys, said common electrode being formed of a metallic gauze which has been flattened to provide a substantially planar surface while still retaining apertures therein.

References Cited by the Examiner

UNITED STATES PATENTS

| | | | |
|---|---|---|---|
| 2,178,969 | 11/1939 | Ruben | 317—230 |
| 2,644,902 | 7/1953 | Hardway | 317—231 |
| 2,661,430 | 12/1953 | Hardway | 317—231 |
| 2,890,414 | 6/1959 | Snavely | 317—231 |
| 3,021,482 | 2/1962 | Estes | 317—231 |
| 3,163,806 | 12/1964 | Estes et al. | 317—231 |
| 3,211,967 | 10/1965 | Grams et al. | 317—231 |

JOHN W. HUCKERT, *Primary Examiner.*

JAMES D. KALLAM, *Examiner.*